United States Patent Office 3,020,137
Patented Feb. 6, 1962

3,020,137
MOTOR FUEL COMPOSITIONS
Albert C. Condo, Jr., Newtown Square, Pa., assignor to The Atlantic Refining Company, Philadelphia, Pa., a corporation of Pennsylvania
No Drawing. Filed Mar. 13, 1959, Ser. No. 799,086
7 Claims. (Cl. 44—78)

This invention relates to improved motor fuel compositions. More particularly, this invention relates to improved motor fuel compositions containing polyethers.

Commercial motor fuel compositions invariably contain small amounts of water, either dissolved or dispersed in fuel. Such water is introduced into a motor fuel in a variety of ways. It may become dissolved or dispersed during blending operations, storage or transportation to the consumer. Water may also be introduced into a motor fuel mixture by condensation from the atmosphere. The effect of such water in motor fuel compositions is not adverse under normal operating conditions, but in cool, humid weather however, the water contained in the motor fuel may freeze and thus form ice particles.

The formation of these ice particles in a motor fuel composition may seriously affect the operation of an internal combustion engine using such a fuel. For example, all gasoline powered vehicles are provided with fuel line filters, such as filter screens and ceramic filters, to prevent the passage of foregin particles such as rust into the combustion chamber of an engine. The formation of ice in either a fuel line or a fuel filter would necessarily block either the fuel line or the filter and prevent the passage of the fuel to the engine.

A fuel system mechanism which is particularly susceptible to maloperation due to ice formation therein is the carburetor. On a cool, moist day the motor fuel composition evaporating in a carburetor exerts a sufficient auto refrigerating effect to condense and freeze the mixture contained both in the fuel composition and in the air entering the carburetor. Fuel vaporization in a carburetor can cause a temperature reduction of the metallic parts of the carburetor of as much as 50° F. below that of the entering air. As a result of such a reduction in temperature to 32° F. or below, ice will form in the mechanism of the carburetor thus causing repeated stalling of the engine.

Heretofore these problems have been overcome somewhat by incorporating into motor fuel compositions various chemical reagents. Examples of such additives include water soluble, freezing point depressants, such as alcohols, glycols, etc. Even though the addition of such compounds to motor fuels did alleviate certain difficulties attributed to ice formation in an internal combustion engine, the amount of additive used was relatively large, i.e., 0.1 percent to as high as 2 percent or 3 percent by volume. These large concentrations were not only uneconomical, but often adversely affected the chemical and physical properties of the motor fuel composition.

It is therefore an object of this invention to provide a motor fuel composition inhibited against ice formation.

It is another object of this invention to provide a method whereby stalling of an internal combustion engine due to ice formation may be prevented or substantially reduced.

It is another object of this invention to provide a motor fuel composition comprising a major proportion of gasoline hydrocarbons and a minor amount of an additive which will suppress or prevent the formation of ice therein, and thus substantially reduce the tendency of an internal combustion to stall in moist, humid weather due to ice formation either in a fuel line or in a carburetor.

Other objects will become apparent from the following description of this invention and the claims.

In accordance with the present invention these and other objects are accomplished by incorporating into a motor fuel composition an extremely small concentration of certain organic polymers known commercially as non-ionic surface active agents, which polymers will be further described hereinafter.

The hydrocarbon base material comprising the major component of the composition of this invention may be any hydrocarbon or mixture of hydrocarbons falling substantially within the commercial gasoline range, that is those hydrocarbons with normally boiling points ranging from about 30° F. to about 435° F. The motor fuel composition of this invention is particularly directed to a mixture of hydrocarbons possessing an ASTM boiling range of from about 90° F. to about 420° F. and particularly a relatively narrow gasoline boiling range falling between 100° F. and 400° F.

The organic polymers to be incorporated into the motor fuel compositions of this invention are, as stated above, commercially known non-ionic surface active agents. A large class of non-ionic surface active agents are the polyethers.

The repetition of weak hydrophilic groups in the polymer molecule has the same effect as one strong hydrophilic group on the solubility of these types of compounds in aqueous solution. This phenomenon is analogous to that of the sugars which, although primarily a hydrocarbon structure, are completely water soluble because of the large number of hydroxyl groups (weak hydrophilic groups) they contain. Thus, it may be concluded that if a nonionic surface active agent does not contain a sufficient number of these repetitious hydrophilic groups to induce complete water solubility, the compounds will be predominantly oil or hydrocarbon soluble. This conclusion has been verified by workers in this field who have prepared a large variety of nonionic surface active agents.

Polyethers suitable for the purposes of this invention contain a number of hydrophilic groups sufficient to produce a polymeric compound which has some solubility in water but which is preferentially soluble in gasoline boiling range hydrocarbons. These preferred polyethers are prepared, for example, by first condensing formaldehyde with a phenol which has hydrocarbon substituent groups in two of the three reactive ortho- and para- positions. The phenol may or may not contain hydrocarbon substituents in the meta position. The substituted phenol is refluxed with a slight excess of aqueous formaldehyde in the presence of a catalytic amount of a mineral acid, such as sulfuric, hydrochloric, or phosphoric acid, or a strong organic acid such as oxalic acid. The yield of this condensation product is usually quantitative and the product may be purified by conventional methods, such as distillation. These products are bis(hydrocarbon substituted hydroxy phenyl) methanes, having the general formula:

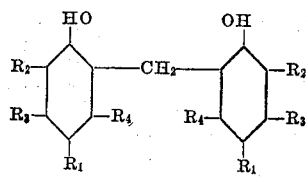

in which $R_1$, $R_2$, $R_3$, and $R_4$ have the folowing significance:

$R_1$ and $R_2$ are hydrocarbon radicals containing from 1 to 18 carbon atoms and $R_3$ and $R_4$ are hydrogen atoms or hydrocarbon radicals containing from 1 to 18 carbon atoms. The sum of the carbon atoms in the radicals represented by $R_1$, $R_2$, $R_3$, and $R_4$ is from 2 to 72. To complete the preparation of the polyethers the bis(hydrocarbon substituted hydroxyphenyl) methane is reacted with an alkylene oxide having a chain of 2 to 3 carbon atoms, such as ethylene oxide or propylene oxide. This reaction is preferably carried out in the presence of a basic catalyst such as a hydroxide or carbonate of an alkali metal at a temperature ranging between about 120° C. to about 190° C. until about 4 to about 20 mols of the alkylene oxide have reacted to produce a compound having a balance of hydrophilic and hydrophobic groups. Since this reaction is exothermic it is desirable to control it by a suitable cooling means. It is also desirable to perform this reaction under superatmospheric pressures, particularly when ethylene oxide is used as a reactant. These polyether materials may be depicted by the general formula:

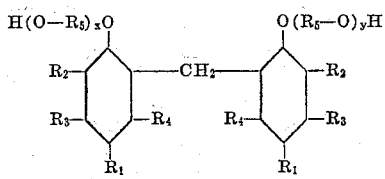

wherein $R_1$, $R_2$, $R_3$, $R_4$ have the same significance as described above and $x$ and $y$ are integers which may be equal to or different from each other and whose sum ranges between about 2 to about 24 and $R_5$ is an alkylene radical such as ethylene or propylene.

The preferred polyethers used in this invention are those prepared by first condensing a 2,4-di-tert-amylphenol with formaldehyde in the presence of an oxalic acid catalyst. To this reaction product there is then added an amount of ethylene oxide sufficient to produce an optimum hydrophobic, hydrophilic balance in the molecule. These preferred materials may be represented as:

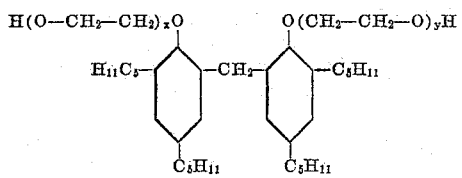

wherein $x$ and $y$ are integers which may be equal to or different from each other but whose sum ranges between about 4 to about 20.

It is most preferred in this invention to use polyether materials having the structural formula:

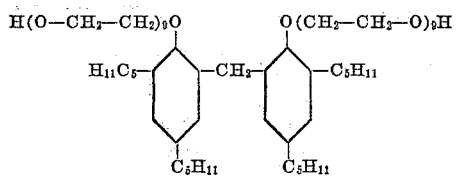

The above described polyethers are added to the hydrocarbon base material in minor amounts ranging between about 0.001 volume percent to about 1.0 volume percent based on the total volume of fuel.

More preferably, however, an amount of polyether incorporated in the gasoline ranging between about 0.005 volume percent to about 0.05 volume percent based on the total volume of fuel is sufficient to substantially reduce the tendency of an internal combustion engine to stall due to carburetor icing.

In the following examples, which are intended as illustrative of certain specific embodiments of this invention, the above described polyether materials are incorporated into a hydrocarbon base material for the purpose of retarding the formation of ice, both in the hydrocarbon base material and in the carburetor of an internal combustion engine employing such base material as a fuel oil.

EXAMPLE 1

A six cylinder Chevrolet, 235 cubic inch displacement engine, mounted on a testing block was used in a series of experiments wherein the above mentioned polyethers were incorporated into gasoline hydrocarbon compositions and the resulting mixtures were tested for their effectiveness in reducing stalling of the Chevrolet engine due to carburetor icing. In order to produce conditions in the carburetor conducive to ice formation, the fuel entering the carburetor was first passed through cooling coils contained in an ice tower. The air entering the carburetor was saturated with water vapor by passing the air through the ice tower prior to its entry through the carburetor. By such means both the fuel and the air entering the carburetor were at a temperature of approximately 38° F.

The actual testing of the various polyether-gasoline hydrocarbon mixtures as effective compositions in preventing ice formation was conducted in a series of engine cycles, one complete engine cycle consisting of four stages. In the first stage the engine is started and allowed to idle for 30 seconds at 500 r.p.m. In the second stage, or "ice forming period," the engine is run at 2000 r.p.m. for $x$ minutes, where "$x$" may be equal to 2, 3, 4, 5, 6, or 7. In the third stage, or "stalling stage," the engine is allowed to idle for 30 seconds at 500 r.p.m. It is during this portion of the cycle that stalling of the engine due to carburetor icing will occur, if it is to occur at all. To complete the cycle, the engine is then stopped and the carburetor system allowed to warm for 1½ minutes to eliminate any ice which might have been formed in the carburetor.

This cycle is performed a total of six times. The first complete cycle is completely discounted as far as the testing procedure is concerned and is utilized in the procedure merely as a flush or purge to eliminate any previous compounds which may have been tested in the same engine. The rating is obtained by measuring the number of stalls per five attempts or cycles at $x$ minutes.

The following table was compiled as a result of a series of test cycles conducted in the Chevrolet testing engine previously described, wherein the polyether-hydrocarbon mixtures used were those preferred in this invention and the volume percentages of polyether added to the gasoline fall within the preferred ranges used in this invention. The gasoline used was a conventional "winter grade" blend of $C_4$ hydrocarbons (to give a Reid vapor pressure of approximately 12.3 pounds per square inch), and the usual refinery gasoline components, i.e. catalytically cracked hydrocarbons, catalytically reformed hydrocarbons, and straight run gasoline components.

*Table 1*

| Conc. of Additive (Volume Percent) | No. of stalls/5 cycles where $x=4$ minutes |
|---|---|
| None | 5 |
| 0.001 | 3 |
| 0.002 | 3 |
| 0.005 | 1 |
| 0.01 | 0 |
| 0.05 | 0 |

The above table shows that a motor fuel composition containing the preferred additives of this invention will greatly reduce or entirely eliminate stalling of an internal combustion engine due to ice formation.

EXAMPLE 2

A series of experiments were conducted in accordance with the procedure set forth in Example 1 to ascertain the effectiveness of the preferred polyether compounds of this invention as compared with commercial additives manufactured and sold for the purpose of reducing or eliminating stalling of an internal combustion engine due to the formation of ice in the carburetor. The base gasoline used was the same as that of Example 1 and the concentrations of the additives and the results obtained are presented in Table II below:

*Table II*

| Additive | Conc. of Additive (Vol. Percent Based on Total Volume of Fuel) | No. of Stalls Per 5 Cycles Where $x=4$ Minutes |
|---|---|---|
| None | | 5 |
| Isopropanol | 1.0 | 5 |
| Do | 1.5 | 2 |
| Do | 2.0 | 0 |
| Dimethyl Formamide | 0.075 | 0 |
| 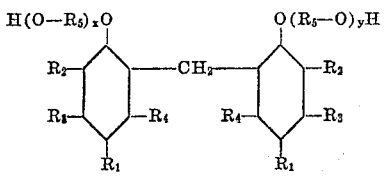 | 0.01 | 0 |

These data show that the compounds of this invention are effective for preventing stalling of an internal combustion engine at concentrations far below the concentrations required of additives employed heretofore. As has been noted, the preferred range of concentrations is from 0.005 to 0.05 volume percent, however, at the higher concentrations up to 1.0 volume percent no deleterious effects of the additive on the gasoline have been noted.

Although the motor fuel of this invention comprises a major amount of hydrocarbon base material, boiling in a gasoline boiling range together with a minor amount of the described polyethers, it will be understood that the gasoline hydrocarbon portions also may contain minor and conventional amounts of other additives such as antiknock agents (i.e. tetraethylead), scavenging agents, solvent oils, gum inhibitors, dyes, lead stabilizers, preignition inhibitors and the like.

I claim:

1. A motor fuel composition consisting essentially of a major amount of hydrocarbon base materials boiling in the gasoline boiling range and an amount ranging between about 0.001 volume percent and about 1.0 volume percent based on the total volume of the fuel of a polyether having the structural formula:

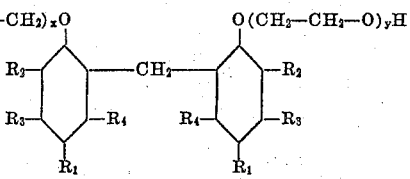

wherein $R_5$ is an alkylene radical selected from the group consisting of ethylene and propylene radicals, and wherein $R_1$ and $R_2$ are alkyl radicals containing from 1 to 18 carbon atoms and $R_3$ and $R_4$ are selected from the group consisting of hydrogen atoms and alkyl radicals containing from 1 to 18 carbon atoms and the sum of the carbon atoms in the radicals represented by $R_1$, $R_2$, $R_3$, and $R_4$ is from 2 to 72, and wherein $x$ and $y$ are integers whose sum ranges between 2 to 24.

2. A motor fuel composition consisting essentially of a major amount of hydrocarbon base materials boiling in the gasoline boiling range and an amount ranging between about 0.001 volume percent and about 1.0 volume percent based on the total volume of the fuel of a polyether having the structural formula:

$$H(O\text{—}CH_2\text{—}CH_2)_xO \qquad O(CH_2\text{—}CH_2\text{—}O)_yH$$

(with substituents $R_1$, $R_2$, $R_3$, $R_4$ on two rings joined by $CH_2$)

wherein $R_1$ and $R_2$ are alkyl radicals containing from 1 to 18 carbon atoms and $R_3$ and $R_4$ are selected from the group consisting of hydrogen atoms and alkyl radicals containing from 1 to 18 carbon atoms and the sum of the carbon atoms in the radicals represented by $R_1$, $R_2$, $R_3$, and $R_4$ is from 2 to 72 and wherein $x$ and $y$ are integers whose sum ranges between about 2 to 24.

3. A motor fuel composition consisting essentially of a major amount of hydrocarbon base materials boiling in the gasoline boiling range and an amount ranging between about 0.005 volume percent and about 0.05 volume percent based on the total volume of the fuel of a polyether having the structural formula:

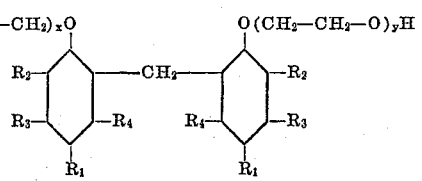

wherein $R_1$ and $R_2$ are alkyl radicals containing from 1 to 18 carbon atoms and $R_3$ and $R_4$ are selected from the group consisting of hydrogen atoms and alkyl radicals containing from 1 to 18 carbon atoms and the sum of the carbon atoms in the radicals represented by $R_1$, $R_2$, $R_3$, and $R_4$ is from 2 to 72 and wherein $x$ and $y$ are integers whose sum ranges between about 4 to 20.

4. A motor fuel composition consisting essentially of a major amount of hydrocarbon base materials boiling in the gasoline boiling range and an amount ranging between about 0.001 volume percent and about 1.0 volume percent based on the total volume of the fuel of a polyether having the structural formula:

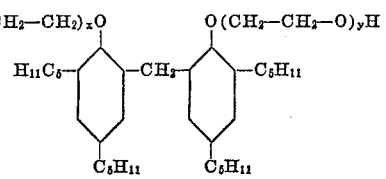

wherein $x$ and $y$ are integers whose sum ranges between about 2 to 24.

5. A motor fuel composition consisting essentially of a major amount of hydrocarbon base materials boiling in the gasoline boiling range and an amount ranging between about 0.005 volume percent and 0.05 volume percent based on the total volume of the fuel of a polyether having the structural formula:

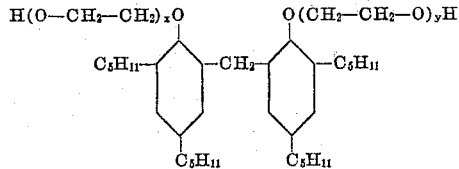

wherein $x$ and $y$ are integers whose sum ranges between about 4 to 20.

6. A motor fuel composition consisting essentially of a major amount of hydrocarbon base materials boiling in the gasoline boiling range and an amount ranging between about 0.001 volume percent and about 1.0 volume percent based on the total volume of the fuel of a polyether having the structural formula:

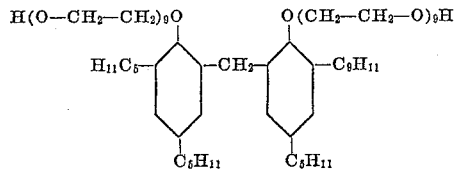

7. A motor fuel composition consisting essentially of a major amount of hydrocarbon base materials boiling in the gasoline boiling range and an amount ranging between about 0.005 volume percent and 0.05 volume percent based on the total volume of the fuel of a polyether having the structural formula:

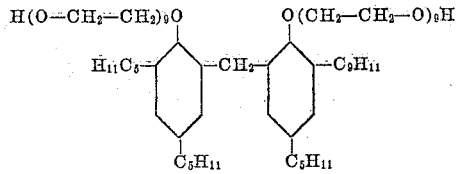

References Cited in the file of this patent
UNITED STATES PATENTS
2,504,064   Bock et al. _____ Apr. 11, 1950

FOREIGN PATENTS
766,591   Great Britain _____ Jan. 23, 1957

OTHER REFERENCES
"Petroleum Refining with Chemicals," Kalichevsky and Kobe, Elsevier Pub. Co., 1956, p. 480.